US012218534B2

(12) United States Patent
Lee et al.

(10) Patent No.: US 12,218,534 B2
(45) Date of Patent: Feb. 4, 2025

(54) SEMICONDUCTOR CIRCUIT FOR BALANCING ENERGY SOURCES

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Sung Yong Lee, Hwaseong-si (KR); Gyu Hyeong Cho, Daejeon (KR); Min Woo Ko, Daejeon (KR); Tae-Hwang Kong, Suwon-si (KR); Sang Ho Kim, Suwon-si (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 411 days.

(21) Appl. No.: 17/032,710

(22) Filed: Sep. 25, 2020

(65) Prior Publication Data
US 2021/0257841 A1    Aug. 19, 2021

(30) Foreign Application Priority Data
Feb. 17, 2020    (KR) .......................... 10-2020-0019006

(51) Int. Cl.
*H02J 7/00*    (2006.01)
*H02J 1/10*    (2006.01)
(52) U.S. Cl.
CPC ............ *H02J 7/0014* (2013.01); *H02J 1/106* (2020.01)

(58) Field of Classification Search
CPC ........... H02J 1/106; H02J 7/0014; H02J 3/381
See application file for complete search history.

(56) References Cited

U.S. PATENT DOCUMENTS 5,677,077 A * 10/1997 Faulk .................... H02J 7/0013
429/90
6,121,751 A *  9/2000 Merritt .................. H02J 7/0018
320/116

(Continued)

FOREIGN PATENT DOCUMENTS

| CN | 101295881 | 10/2008 |
|---|---|---|
| KR | 10-0831160 | 5/2008 |

(Continued)

*Primary Examiner* — Richard Isla
*Assistant Examiner* — Sadia Kousar

(57) ABSTRACT

A semiconductor circuit includes a first selection circuit which selects a first battery or a first capacitor, a second selection circuit which selects a second battery or a second capacitor, a voltage measuring circuit which measures a first voltage of the first battery or the first capacitor selected by the first selection circuit, and measures a second voltage of the second battery or the second capacitor selected by the second selection circuit, a controller which compares the first voltage and the second voltage to generate a comparison result, and a switching circuit which receives a signal based on a target output voltage, connects the first battery or capacitor selected by the first selection circuit, and the second battery capacitor selected by the second selection circuit in an interconnection relationship based on the comparison result to provide to an output terminal an output voltage responsive to the target output voltage.

20 Claims, 11 Drawing Sheets

(56) References Cited

U.S. PATENT DOCUMENTS

| | | | |
|---|---|---|---|
| 9,368,977 | B2 | 6/2016 | Liang et al. |
| 9,692,242 | B2 | 6/2017 | Butzmann |
| 9,722,435 | B2 | 8/2017 | Park |
| 9,948,117 | B2 | 4/2018 | Lu |
| 10,074,995 | B2 | 9/2018 | Smedley et al. |
| 10,319,981 | B2 | 6/2019 | Carkner et al. |
| 2002/0177018 | A1* | 11/2002 | Fuglevand ........ H01M 8/04559 429/432 |
| 2006/0092583 | A1* | 5/2006 | Alahmad ............ H02J 7/0024 361/15 |
| 2012/0286578 | A1* | 11/2012 | Uno .................... H02J 7/0024 307/77 |
| 2020/0059106 | A1* | 2/2020 | Karlsson ............ H01M 10/425 |
| 2022/0131390 | A1* | 4/2022 | Ryu .................... H02J 7/0016 |

FOREIGN PATENT DOCUMENTS

| | | |
|---|---|---|
| KR | 10-1402802 | 6/2014 |
| KR | 10-1829704 | 2/2018 |

\* cited by examiner

100c

SEMICONDUCTOR CIRCUIT FOR BALANCING ENERGY SOURCES

CROSS-REFERENCE TO RELATED APPLICATION

This application claims priority under 35 U.S.C. s 119 to Korean Patent Application No. 10-2020-0019006, filed on Feb. 17, 2020, in the Korean Intellectual Property Office, the disclosure of which is incorporated by reference herein in its entirety.

FIELD OF THE DISCLOSURE

The present disclosure relates to a semiconductor circuit, and more particularly to a circuit for balancing dischargeable energy sources.

DISCUSSION OF RELATED ART

Electronic devices such as wearable devices and mobile devices may include multiple batteries. A capacity deviation may exist between the batteries, such as due to fabrication processes. Also, electronic devices including batteries connected by a serial structure, a parallel structure, or a mixed structure may have voltage imbalances due to other electrochemical characteristics between the batteries. Battery balancing may be applied to reduce differences between the voltages of the batteries.

SUMMARY

An exemplary embodiment of the present disclosure provides a semiconductor circuit capable of improving the use efficiency of a battery. An exemplary embodiment of the present disclosure provides a semiconductor circuit that maintains a stable output voltage.

According to an exemplary embodiment of the present disclosure, there is provided a semiconductor circuit including a first selection circuit which selects a first battery or a first capacitor; a second selection circuit which selects a second battery or a second capacitor; a voltage measuring circuit which measures a first voltage of the first battery or the first capacitor selected by the first selection circuit, and measures a second voltage of the second battery or the second capacitor selected by the second selection circuit; a controller which compares the first voltage and the second voltage to generate a comparison result; and a switching circuit which receives a signal based on a target output voltage, connects the first battery or the first capacitor selected by the first selection circuit, and the second battery or the second capacitor selected by the second selection circuit in an interconnection relationship based on the comparison result to provide to an output terminal an output voltage responsive to the target output voltage.

According to an exemplary embodiment of the present disclosure, there is provided a semiconductor circuit including a plurality of batteries; a switching circuit which connects each of the plurality of batteries in series and/or in parallel with each other of the plurality of batteries, respectively; a voltage measuring circuit which measures voltages of each of the plurality of batteries; and a controller which is provided with a target output voltage, determines a series or parallel connection state of the plurality of batteries based on a number of the plurality of batteries and measured voltages of each of the plurality of batteries, and provides the switching circuit with a control signal for determining the series or parallel connection state of the plurality of batteries based on the measured voltages.

According to an exemplary embodiment of the present disclosure, there is provided a semiconductor circuit including a first battery; a second battery different from the first battery; a switching circuit which connects the first and second batteries in series or in parallel; and a selection circuit which connects to the second battery a first capacitor instead of the first battery when the first battery is discharged, wherein the switching circuit connects the first capacitor and the second battery in series or in parallel depending on a voltage of the first capacitor, and wherein the first capacitor is connected in parallel to the second battery when the first capacitor is to be charged, and the first capacitor is connected in series to the second battery when the first capacitor is to be discharged.

However, embodiments of the present disclosure are not restricted to those set forth herein. The above and other embodiments of the present disclosure will become more apparent to one of ordinary skill in the art to which the present disclosure pertains by referencing the detailed description given below.

BRIEF DESCRIPTION OF THE DRAWINGS

The above and other embodiments of the present disclosure will become more apparent by describing in detail exemplary embodiments thereof with reference to the attached drawings, in which.

DETAILED DESCRIPTION

Figure 1:
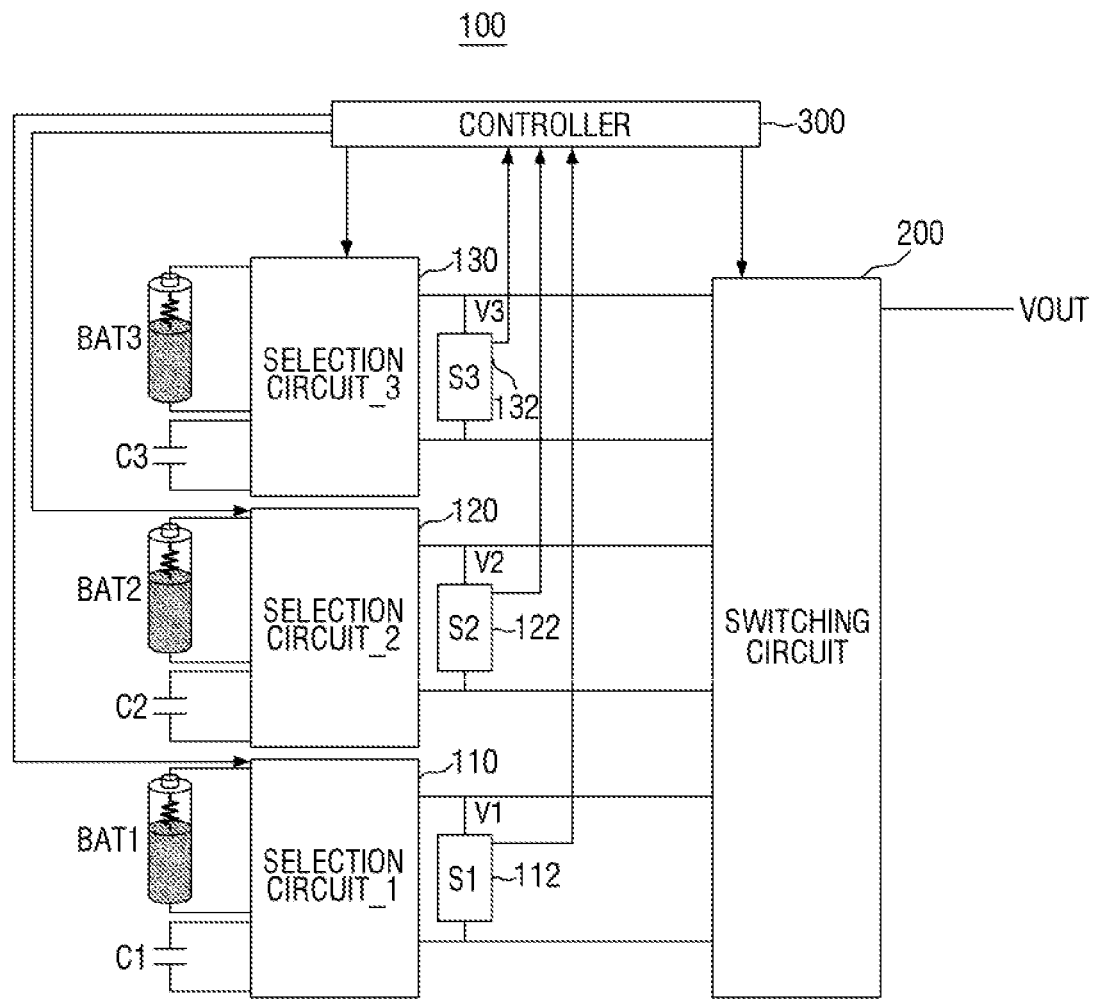
FIG. 1 is a hybrid schematic block and circuit diagram for explaining a semiconductor circuit according to an exemplary embodiment of the present disclosure.

FIG. 1 illustrates a battery control circuit according to an exemplary embodiment of the present disclosure.

Referring to FIG. 1, a semiconductor circuit 100 according to an embodiment of the present disclosure includes batteries BAT1 to BAT3, capacitors C1 to C3, selection circuits 110, 120 and 130, voltage measuring circuits 112, 122 and 132, a switching circuit 200 and a controller 300. In this drawing, although the first selection circuit to the third selection circuit 110, 120 and 130, and the first battery BAT1 to the third battery BAT3 are shown, the number of the selection circuits and the number of the batteries are not limited thereto. Further, although the first selection circuit 110, the second selection circuit 120 and the third selection circuit 130 are shown separately in FIG. 1, they may be implemented as a single selection circuit. Moreover, although separate voltage measuring circuits 112, 122 and 132 are shown, these may be incorporated into the selection circuits 110, 120 and 130 or into the single selection circuit.

The first battery BAT1 and the first capacitor C1 are connected to the first selection circuit 110. The first selection circuit 110 may select the first battery BAT1 and/or the first capacitor C1 depending on a selection signal provided from the controller 300. The first selection circuit 110 may connect the selected first battery BAT1 and/or the selected first capacitor C1 to the switching circuit 200.

The second battery BAT2 and the second capacitor C2 are connected to the second selection circuit 120. The second selection circuit 120 may select the second battery BAT2 and/or the second capacitor C2 depending on the selection signal provided from the controller 300. The second selection circuit 120 may connect the selected second battery BAT2 and/or the selected second capacitor C2 to the switching circuit 200.

The third battery BAT1 and the third capacitor C1 are connected to the third selection circuit 130. The third selection circuit 130 may select the third battery BAT3 and/or the third capacitor C3 depending on the selection signal provided from the controller 300. The third selection circuit 130 may connect the selected third battery BAT1 and/or the selected third capacitor C3 to the switching circuit 200.

Here, the first battery BAT1, the second battery BAT2 and the third battery BAT3 may be batteries having substantially the same structure. The first battery BAT1, the second battery BAT2, and the third battery BAT3 may be non-rechargeable primary batteries, such as alkaline batteries and/or dry batteries. Also, the first capacitor C1, the second capacitor C2 and the third capacitor C3 may be capacitors having substantially the same structure.

The first voltage measuring circuit 112 may be connected to the first selection circuit 110. The first voltage measuring circuit 112 may be connected to one of the first battery BAT1 or the first capacitor C1 selected by the first selection circuit 110 to measure the first voltage V1 of the selected first battery BAT1 or the first capacitor C1. The measured first voltage V1 of the first battery BAT1 or the first capacitor C1 may be provided to the controller 300.

The second voltage measuring circuit 122 may be connected to the second selection circuit 120. The second voltage measuring circuit 122 may be connected to one of the second battery BAT2 or the second capacitor C2 selected by the second selection circuit 120 to measure a second voltage V2 of the selected second battery BAT2 or the second capacitor C2. The measured second voltage V2 of the second battery BAT2 or the second capacitor C2 may be provided to the controller 300.

The third voltage measuring circuit 132 may be connected to the third selection circuit 130. The third voltage measuring circuit 132 may be connected to one of the third battery BAT3 or the third capacitor C3 selected by the third selection circuit 130 to measure a third voltage V3 of the selected third battery BAT3 or the third capacitor C3. The measured third voltage V3 of the third battery BAT3 or the third capacitor C3 may be provided to the controller 300.

The switching circuit 200 may connect the first battery BAT1 and/or the first capacitor C1 selected by the first selection circuit 110, the second battery BAT2 and/or the second capacitor C2 selected by the second selection circuit 120, and/or the third battery BAT3 and/or the third capacitor C3 selected by the third selection circuit 130 in series or in parallel, and may generate an output voltage Vx using them. The switching circuit 200 is connected to an output terminal to provide an output voltage Vx. Hereinafter, the structure of the switching circuit 200 may be described in greater detail with reference to FIG. 2.

The controller 300 may provide selection signals to the first to third selection circuits 110, 120 and 130. The first to third selection circuits 110, 120 and 130 may select the first to third batteries BAT1 to BAT3 and/or the first to third capacitors C1 to C3 depending on the selection signal. The selection signal may include, for example, information on the number of batteries to be provided to the semiconductor circuit 1. For example, if the number of batteries provided to the semiconductor circuit 100 is 1, one selection circuit of the first to third selection circuits 110, 120 and 130 may select the corresponding battery, and the remaining selection circuits may each select the corresponding capacitor. If the number of batteries provided to the semiconductor circuit 100 is 2, two selection circuits of the first to third selection circuits 110, 120 and 130 may select the corresponding battery, and the remaining selection circuit may select the corresponding capacitor. If the number of batteries provided to the semiconductor circuit 100 is 3, all the first to third selection circuits 110, 120 and 130 may select the corresponding battery.

The selection signal may include, for example, information on the discharged battery. For example, if the first battery BAT1 is discharged in the semiconductor circuit 100 provided with the first to third batteries BAT1 to BAT3, the first selection circuit 110 may select the first capacitor C1, the second selection circuit 120 may select the second battery BAT2, and the third selection circuit 130 may select the third battery BAT3.

The controller 300 may compare the voltages measured by the first to third voltage measuring circuits 112, 122 and 132 to generate a comparison result. The controller 300 may determine an interconnection relationship between the first to third batteries BAT1 to BAT3 or the first to third capacitors C1 to C3 selected in the first to third selection circuits 110, 120 and 130, on the basis of the number of batteries to be provided to the semiconductor circuit 1, the generated comparison result, and the target output voltage for the semiconductor circuit 1. The target output voltage here may mean an output voltage sufficient for the electronic device including the semiconductor circuit 1.

The controller 300 may provide a control signal including the determined interconnection relationship to the switching circuit 200. The switching circuit 200 may connect the first to third batteries BAT1 to BAT3 or the first to third capacitors C1 to C3 selected by the first to third selection circuits 110, 120 and 130 according to the control signal in parallel or in series for a determined time. The interconnection relationship may be adjusted depending on the comparison result generated by the controller 300. Therefore, in the semiconductor circuits according to an embodiment of the present disclosure, the interconnection relationship of the batteries is not determined, and the interconnection relationship of the batteries may be adjusted depending on the number of batteries, the target output voltage, and the battery voltage.

In an embodiment of the present disclosure, although the first to third selection circuits 110, 120 and 130, the first to third voltage measuring circuits 112, 122 and 132, the switching circuit 200 and the controller 300 are expressed by other blocks to conceptually explain the operations thereof, its meaning is not implemented by a separate circuit. That is, the first to third selection circuits 110, 120 and 130, the first to third voltage measuring circuits 112, 122 and 132, the switching circuit 200 and the controller 300 may be implemented by a single circuit or may be implemented by a plurality of circuits.

Figure 2:
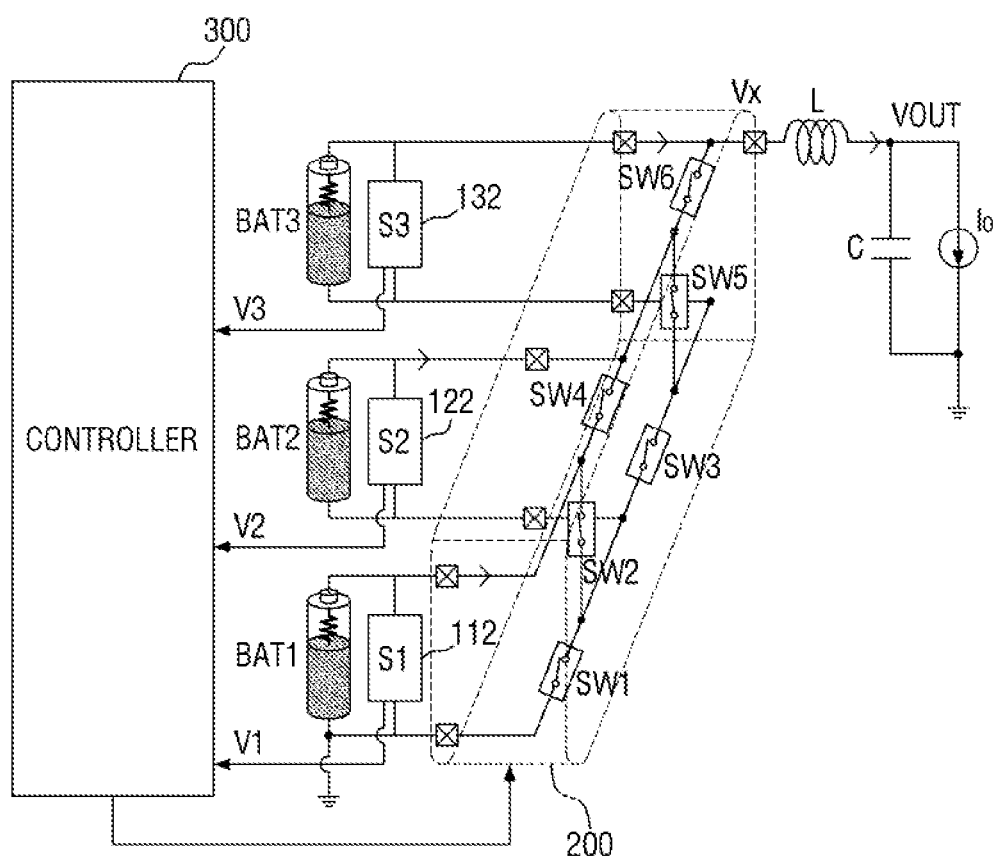
FIG. 2 is a hybrid schematic block and circuit diagram for explaining a semiconductor circuit according to an exemplary embodiment of the present disclosure.
Figure 3:
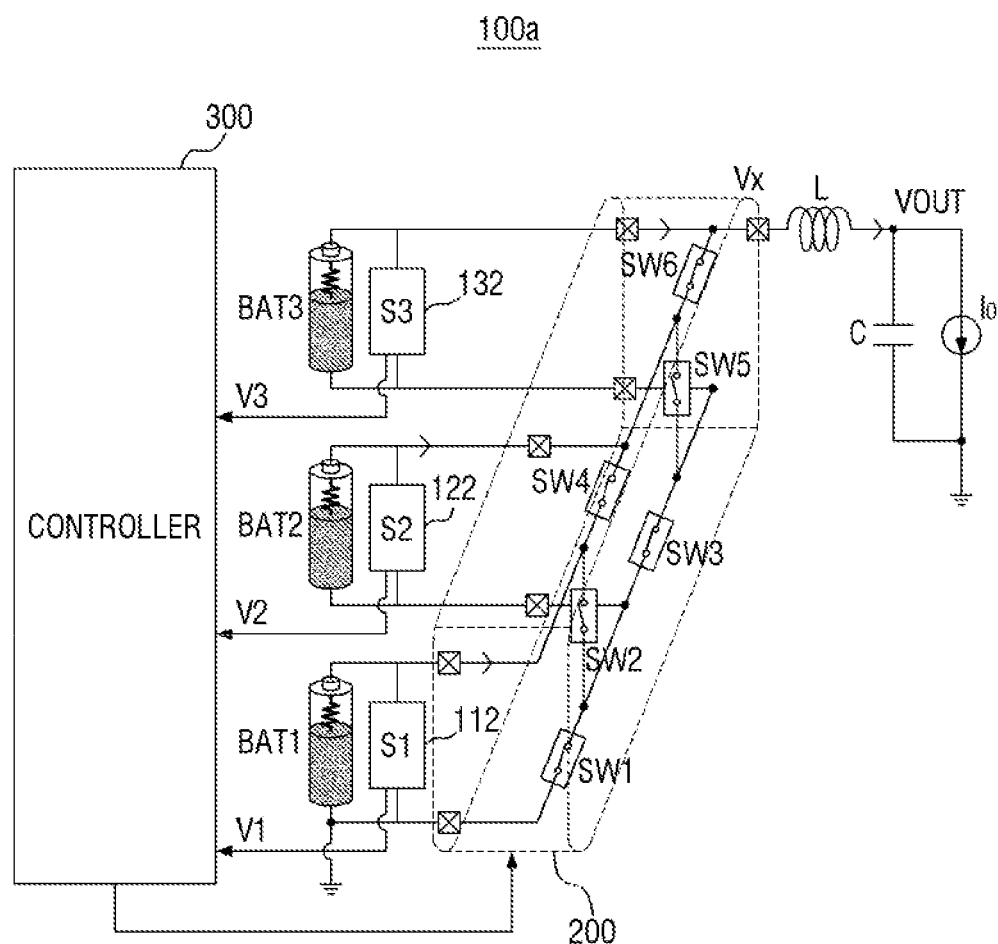
FIG. 3 is a hybrid schematic block and circuit diagram for explaining a semiconductor circuit according to an exemplary embodiment of the present disclosure.

FIGS. 2 and 3 illustrate circuits for explaining the semiconductor circuit according to an embodiment of the present disclosure.

Referring to FIGS. 1 and 2, the switching circuit 200 has an input terminal to which a ground voltage is connected, and an output terminal connected to an inductor L. The switching circuit 200 may output an output voltage Vx to the output terminal. The output terminal may be connected to a low pass filter (LPF) including an inductor L and a capacitor C. The low pass filter may filter high-frequency components of the output voltage Vx that is output to the output terminal. Therefore, the low-frequency component of the output voltage Vx may be output as a final voltage VOUT or a final current Io.

The switching circuit 200 may include first to sixth switches SW1 to SW6. A first switch SW1 may be connected to a cathode of the first battery BAT1 or the first capacitor C1 selected by the first selection circuit 110, and a cathode of the second battery BAT2 or the second capacitor C2 selected by the second selection circuit 120. A second switch SW2 may be connected to an anode of the first battery BAT1 or the first capacitor C1 selected by the first selection circuit 110, and the cathode of the second battery BAT2 or the second capacitor C2 selected by the second selection circuit 120. A third switch SW3 may be connected to the cathode of the second battery BAT2 or the second capacitor C2 selected by the second selection circuit 120, and a cathode of the third battery BAT3 or the third capacitor C3 selected by the third selection circuit 130. A fourth switch SW4 may be connected to the anode of the first battery BAT1 or the first capacitor C1 selected by the first selection circuit 110, and an anode of the second battery BAT2 or the second capacitor C2 selected by the second selection circuit 120. A fifth switch SW5 may be connected to an anode of the second battery BAT2 or the second capacitor C2 selected by the second selection circuit 120, and the third battery BAT3 or the third capacitor C3 selected by the third selection circuit 130. A sixth switch SW6 may be connected to the anode of the second battery BAT2 or the second capacitor C2 selected by the second selection circuit 120, and an anode of the third battery BAT3 or the third capacitor C3 selected by the third selection circuit 130. The anode of the third battery BAT3 may be connected to the output terminal. The switching circuit 200 may turn on/off the first to sixth switches SW1 to SW6 to connect the selected batteries BAT1 to BAT3 or capacitors C1 to C3 in series or in parallel.

Therefore, since the semiconductor circuit 100 according to an embodiment of the present disclosure may change the interconnection relationship of the batteries, it is possible to have flexibility of the interconnection relationship of the batteries.

Referring to FIG. 2, the semiconductor circuit 100a according to an embodiment of the present disclosure may be provided with three batteries BAT1 to BAT3, and all the first to third selection circuits 110, 120 and 130 may select the first to third batteries BAT1 to BAT3.

The switching circuit 200 may connect the first to third batteries BAT1 to BAT3 in series in accordance with a control signal provided from the controller 300. For example, the second switch SW2 and the fifth switch SW5 may be in an ON state, and the first switch SW1, the third switch SW3, the fourth switch SW4 and the sixth switch SW6 may be in an OFF state.

Referring to FIG. 3, the switching circuit 200 may connect the first to third batteries BAT1 to BAT3 in parallel in accordance with the control signal provided from the controller 300. For example, the first switch SW1, the third switch SW3, the fourth switch SW4, and the sixth switch SW6 may be in the ON state, and the second switch SW2 and the fifth switch SW5 may be in the OFF state.

Moreover, the switching circuit 200 may connect the first battery BAT1 in series and the second to third batteries BAT2 to BAT3 in parallel in accordance with the control signal provided from the controller 300. For example, the second switch SW2, the third switch SW3, and the sixth switch SW6 may be in the ON state, and the first switch SW1, the fourth switch SW4, and the fifth switch SW5 may be in the OFF state.

Figure 4:
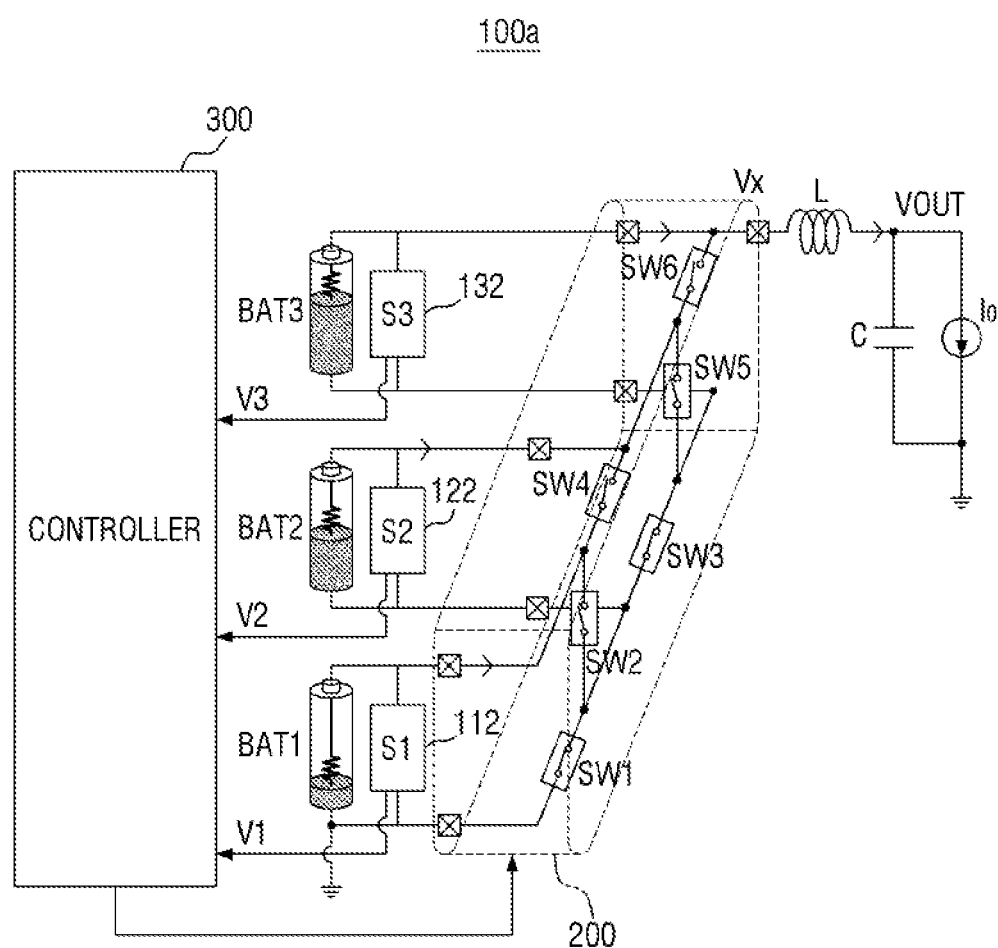
FIG. 4 is a hybrid schematic block and circuit diagram for explaining operation of the semiconductor circuits of FIGS. 2 and 3 according to an exemplary embodiment of the present disclosure.
Figure 5:
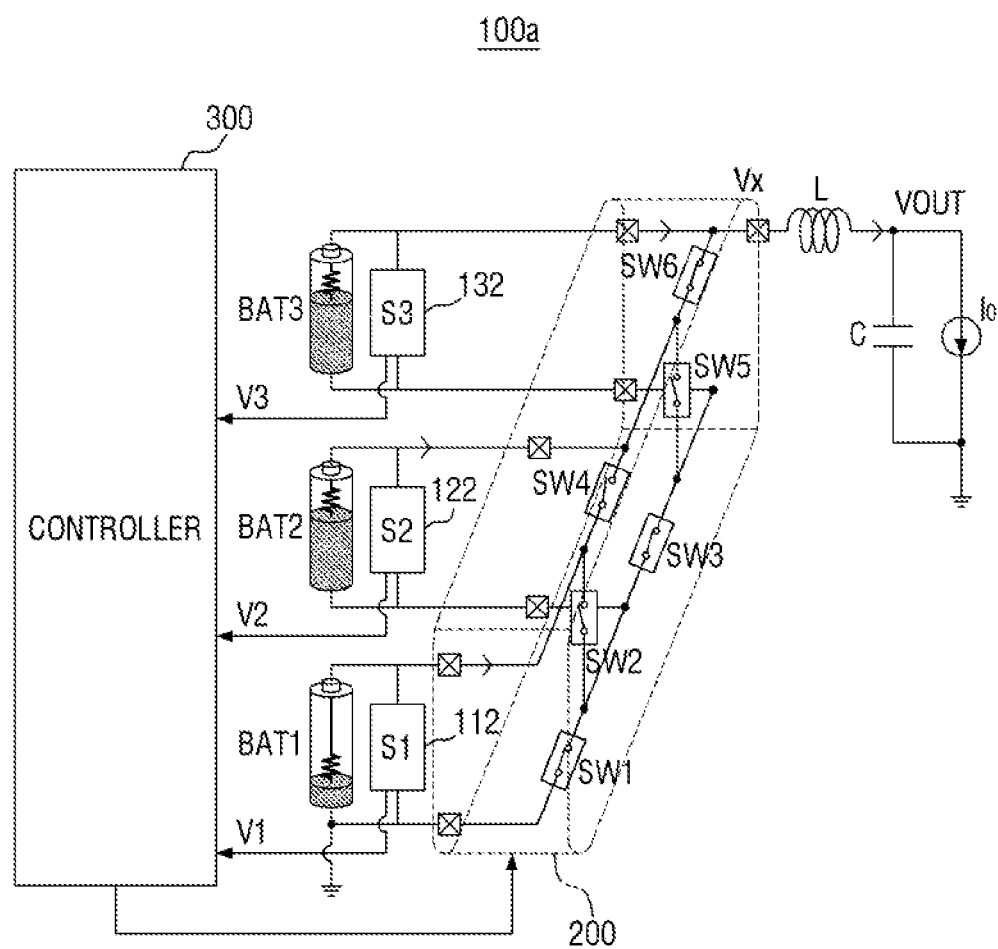
FIG. 5 is a hybrid schematic block and circuit diagram for explaining operation of the semiconductor circuits of FIGS. 2 and 3 according to an exemplary embodiment of the present disclosure.

FIGS. 4 and 5 are diagrams for explaining the operation of the semiconductor circuits of FIGS. 2 and 3.

Referring to FIG. 4, the first voltage measuring circuit 112 may measure the first voltage V1 of the first battery, the second voltage measuring circuit 122 may measure the second voltage V2 of the second battery, and the third voltage measuring circuit 132 may measure the third voltage V3 of the third battery. The measured first to third voltages V1 to V3 may be provided to the controller 300.

The controller 300 may compare the magnitudes of the measured first to third voltages V1 to V3 and may generate comparison results. The controller 300 may determine the interconnection relationship between the first to third batteries BAT1 to BAT3 on the basis of the comparison result. The controller 300 may provide the switching circuit 200 with a control signal including an interconnection relationship between the first to third batteries BAT1 to BAT3 in which the battery having the voltage of lowest magnitude among the first to third voltages V1 to V3 is disconnected.

For example, the third voltage V3 may be greater than the second voltage V2 and the first voltage V1. A difference in magnitude between the third voltage V3 and the second voltage V2 may be greater than an arbitrary set voltage. The arbitrary set voltage may be set differently for each semiconductor circuit 1. The arbitrary set voltage may mean a value within a range in which the second voltage V2 and the third voltage V3 may be regarded as being the same as each other.

At this time, the controller 300 may control the switching circuit 200 so that the semiconductor circuit 100a is driven, using only the third battery BAT3. The controller 300 disconnects the connection between the first battery BAT1 and the second battery BAT2, and may provide the switching circuit 200 with the control signal including the interconnection relationship which connects the third battery BAT3 to the output terminal.

As a result, the switching circuit 200 may change the first switch SW1 and the third switch SW3 to the ON state, and may change the second switch SW2, the fourth switch SW4, the fifth switch SW5, and the sixth switch SW6 to the OFF state. The semiconductor circuit 100a may generate the output voltage Vx using the third battery BAT3.

Thereafter, the controller 300 compares the magnitudes of the measured first to third voltages V1 to V3, and if the third voltage V3 becomes equal to or less than the first voltage V1 or the second voltage V2, the controller 300 may set the interconnection relationship between the first to third batteries BAT1 to BAT3 on the basis of the target output voltage and the first to third voltages V1 to V3. The controller 300 may provide the switching circuit 200 with a control signal including the determined interconnection relationship between the first to third batteries BAT1 to BAT3. The switching circuit 200 may change the first to third batteries BAT1 to BAT3 in accordance with the control signal.

Referring to FIG. 5, the third voltage V3 may be higher than the second voltage V2 and the first voltage V1. The difference in magnitude between the third voltage V3 and the second voltage V2 may be smaller than the arbitrary set voltage. The difference in magnitude between the second voltage V2 and the third voltage V3 may have a value within the range in which the second voltage V2 and the third voltage V3 may be regarded as being the same as each other.

At this time, the controller 300 may control the switching circuit 200 so that the semiconductor circuit 100a is driven, using the first battery BAT1 and the second battery BAT2. The controller 300 may provide the switching circuit 200 with the control signal including the connection information which disconnects the connection of the first battery BAT1, and connects the second battery BAT2 and the third battery BAT3 to the output terminal.

As a result, the switching circuit 200 may change the first switch SW1, the third switch SW3, and the sixth switch SW6 to the ON state, and may change the second switch SW2, the fourth switch SW4 and the fifth switch SW5 to the OFF state. The semiconductor circuit 100a may generate an output voltage Vx, using the second battery BAT2 and the third battery BAT3.

Thereafter, the controller 300 compares the measured magnitudes of the first to third voltages V1 to V3, and if the second voltage V2 or the third voltage V3 become equal to or less than the first voltage V1, the controller 300 may determine the interconnection relationship between the first to third batteries BAT1 to BAT3 on the basis of the target output voltage and the first to third voltages V1 to V3. The controller 300 may provide the switching circuit 200 with a control signal including the determined interconnection relationship between the first to third batteries BAT1 to BAT3. The switching circuit 200 may change the first to third batteries BAT1 to BAT3 in accordance with the control signal.

The semiconductor circuit 100a according to an embodiment of the present disclosure may be operated by connecting the first to third batteries BAT1 to BAT3. A voltage imbalance may exist in each of the first to third batteries BAT1 to BAT3, due to various factors such as capacity deviations and other electrochemical characteristics. If the voltage of the specific battery among the first to third batteries BAT1 to BAT3 is over-discharged, not only the performance of the specific battery is degraded, but also the entire battery may be deteriorated and shortened. In addition, even if only one battery is discharged, the operation of the semiconductor circuit may be disabled, and the use of an undischarged battery may also be disabled.

However, the semiconductor circuit 100a according to an embodiment of the present disclosure measures the first voltage V1 of the first battery, the second voltage V2 of the second battery, and the third voltage V3 of the third battery, and may control the switching circuit 200 on the basis of the measured first to third voltages V1 to V3, and cell balancing for adjusting the cell voltages of the first to third batteries BAT1 to BAT3 may be performed. Therefore, the first to third batteries BAT1 to BAT3 may be efficiently used, and the life expectancy of the first to third batteries BAT1 to BAT3 may be increased. Further, since the first to third batteries BAT1 to BAT3 may be efficiently used to provide a stable output voltage, the semiconductor device to which the semiconductor circuit is applied may be used more stably.

Figure 6:
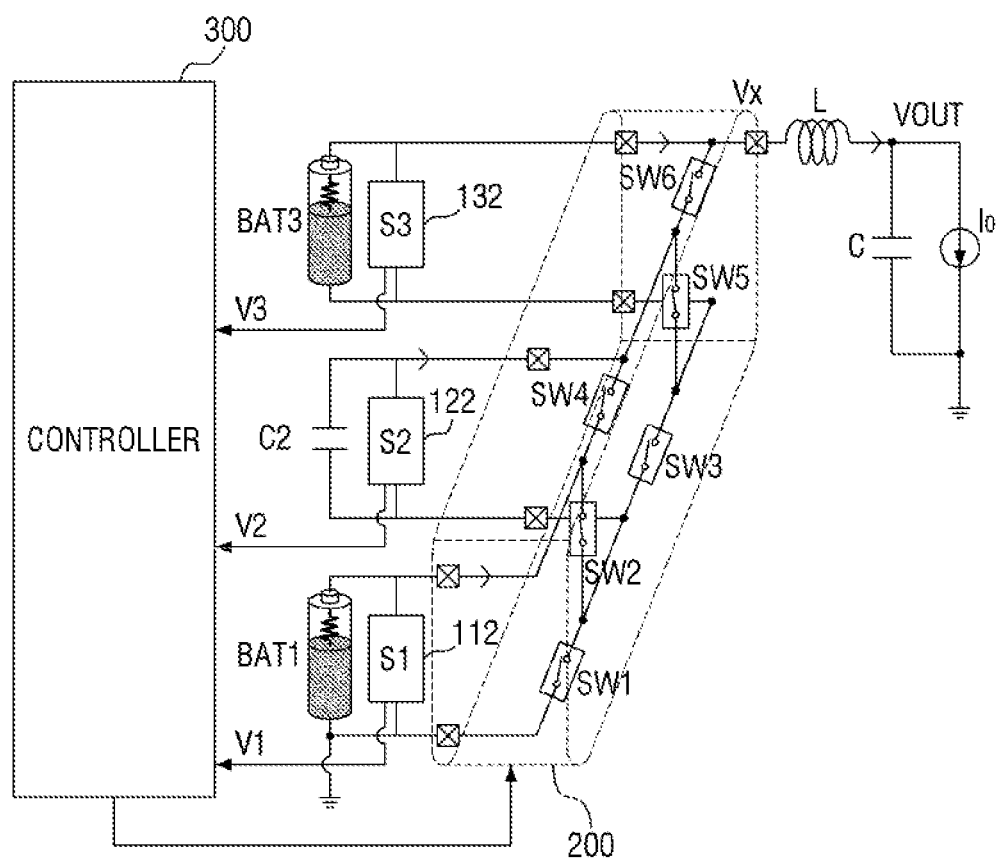
FIG. 6 is a hybrid schematic block and circuit diagram for explaining a semiconductor circuit according to an exemplary embodiment of the present disclosure.
Figure 7:
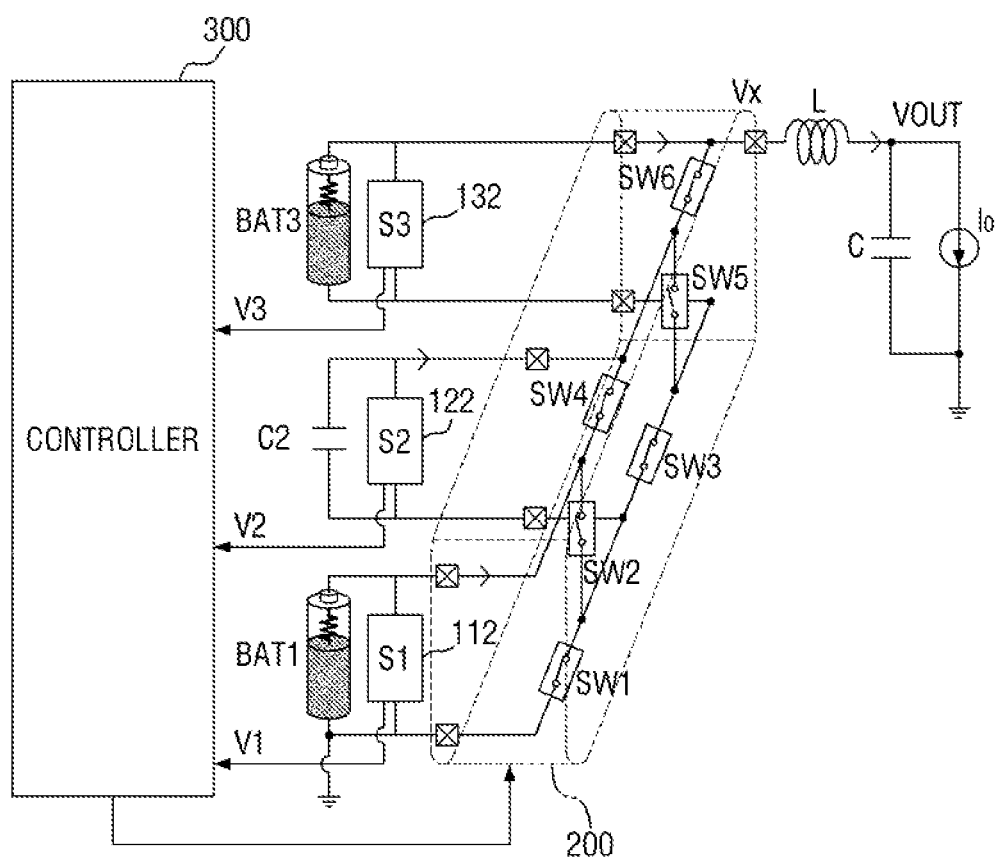
FIG. 7 is a hybrid schematic block and circuit diagram for explaining a semiconductor circuit according to an exemplary embodiment of the present disclosure.

FIGS. 6 and 7 illustrate circuits for explaining a semiconductor circuit according to an embodiment of the present disclosure.

Referring to FIG. 6, a semiconductor circuit 100b according to an embodiment of the present disclosure may be provided with two batteries BAT1 and BAT3, the first selection circuit 110 may select the first battery BAT1, the second selection circuit 120 may select the second capacitor C2, and the third selection circuit 130 may select the third battery BAT3. Although FIG. 6 shows that the first battery BAT1, the third battery BAT3, and the second capacitor C2 are selected, the present disclosure is not limited thereto, and the selection circuits 110 to 130 may each select the corresponding battery depending on the number of batteries provided. For example, the first battery BAT1 may be selected by the first selection circuit 110, the second battery BAT2 may be selected by the second selection circuit 120, and the third capacitor C3 may be selected by the third selection circuit 130. Alternatively, the first capacitor C1 may be selected by the first selection circuit 110, the second battery BAT2 may be selected by the second selection circuit 120, and the third battery BAT3 may be selected by the third selection circuit 130.

The batteries BAT1, BAT2 and/or BAT3 may be electrically rechargeable. If so, the selection circuit may interconnect to them with reversed polarity and/or in a different interconnection relationship relative to the capacitors C1, C2 and/or C3, respectively, for recharging purposes.

The switching circuit 200 may connect the first battery BAT1, the second capacitor C2, and the third battery BAT3 in series in accordance with the control signal provided from the controller 300. For example, the second switch SW2 and the fifth switch SW5 may be in ON state, and the first switch SW1, the third switch SW3, the fourth switch SW4 and the sixth switch SW6 may be in the OFF state.

Referring to FIG. 7, the switching circuit 200 may connect the first to third batteries BAT1 to BAT3 in parallel in accordance with the control signal provided from the controller 300. For example, the first switch SW1, the third switch SW3, the fourth switch SW4, and the sixth switch SW6 may be in the ON state, and the second switch SW2 and the fifth switch SW5 may be in the OFF state.

Figure 8:
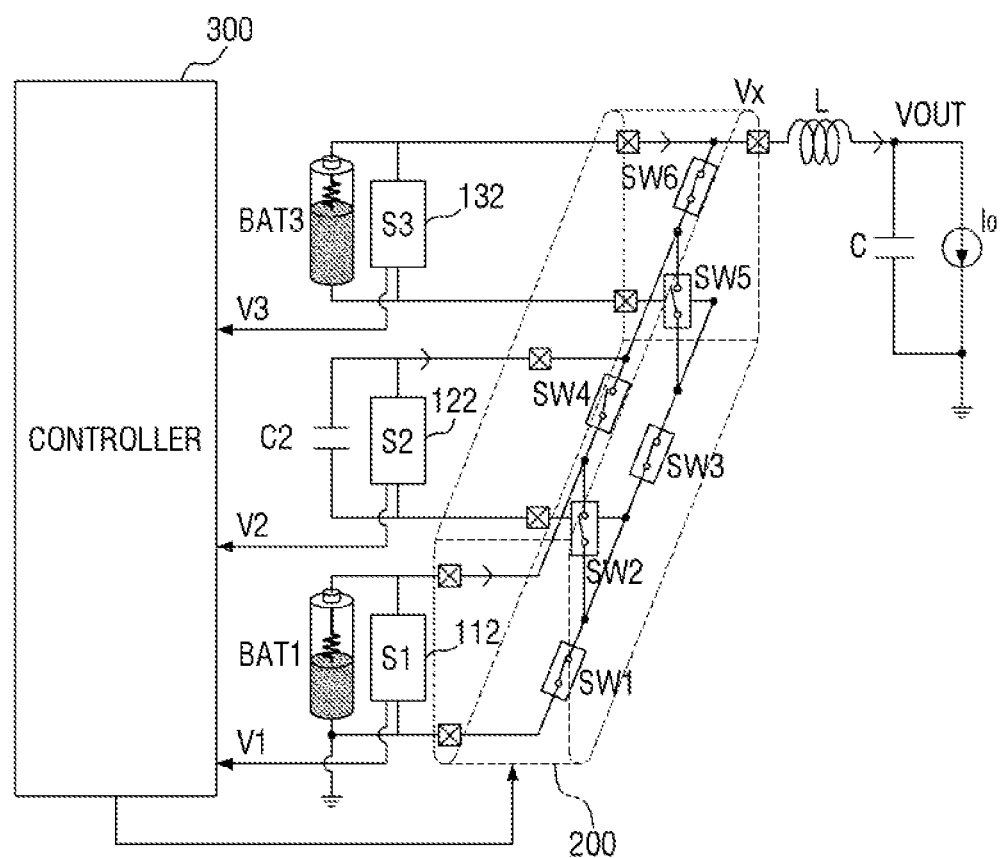
FIG. 8 is a hybrid schematic block and circuit diagram for explaining operation of the semiconductor circuits of FIGS. 6 and 7 according to an exemplary embodiment of the present disclosure.

FIG. 8 is a diagram for explaining the operation of the semiconductor circuit of FIGS. 6 and 7.

Referring to FIG. 8, the first voltage measuring circuit 112 may measure the first voltage V1 of the first battery, the second voltage measuring circuit 122 may measure the second voltage V2 of the second capacitor, and the third voltage measuring circuit 132 may measure the third voltage V3 of the third battery. The measured first to third voltages V1 to V3 may be provided to the controller 300.

The controller 300 may compare the magnitudes of the measured first to third voltages V1 to V3. If the second capacitor C2 is discharged, the controller 300 may compare the magnitude of the first voltage V1 and the third voltage V3, and may generate a comparison result. The controller 300 may determine the interconnection relationship between the first battery BAT1, the second capacitor C2, and the third battery BAT3 on the basis of the comparison result. The controller 300 may provide the switching circuit 200 with the control signal including an interconnection relationship between the first battery BAT1, the second capacitor C2 and the third battery BAT3 in which a battery having voltage of a lower magnitude between the first voltage V1 and the third voltage V3 is disconnected.

For example, the third voltage V3 may be greater than the first voltage V1 and the second voltage V2. The controller 300 may control the switching circuit 200 so that the semiconductor circuit 100b is driven, using only the third battery BAT3. The controller 300 may provide the switching circuit 200 with the control signal including the interconnection relationship which disconnects the connection of the first battery BAT1 and connects the second capacitor C2 and the third battery BAT3 in parallel.

As a result, the switching circuit 200 may change the first switch SW1, the third switch SW3, and the sixth switch SW6 to the ON state, and may change the second switch SW2, the fourth switch SW4 and the fifth switch SW5 to the OFF state. The semiconductor circuit 100b may charge the second capacitor C2 using the third battery BAT3 and generate the output voltage Vx.

Thereafter, the controller 300 compares the magnitudes of the measured second voltage V2 and the third voltage V3, and if the second voltage V2 becomes equal to the third voltage V3, the controller 300 may determine the interconnection relationship between the first battery BAT1, the second capacitor C2, and the third battery BAT3 on the basis of the target output voltage and the first to third voltages V1 to V3. The controller 300 may provide the switching circuit 200 with a control signal including the determined interconnection relationship between the first to third batteries BAT1 to BAT3. The switching circuit 200 may change the first battery BAT1, the second capacitor C2, and the third battery BAT3 in accordance with the control signal. That is, the switching circuit 200 may generate the output voltage Vx, using the second capacitor C2 instead of the second battery BAT2.

Thereafter, if the second capacitor C2 is discharged again, the second capacitor C2 may be charged by being connected to the battery having the voltage of higher magnitude among the first voltage V1 and the third voltage V3.

Therefore, the semiconductor circuit 100b according to an embodiment of the present disclosure may generate the output voltage of the electronic device to which the semiconductor circuit 100b is applied, using two batteries and the single capacitor instead of three batteries.

Figure 9:
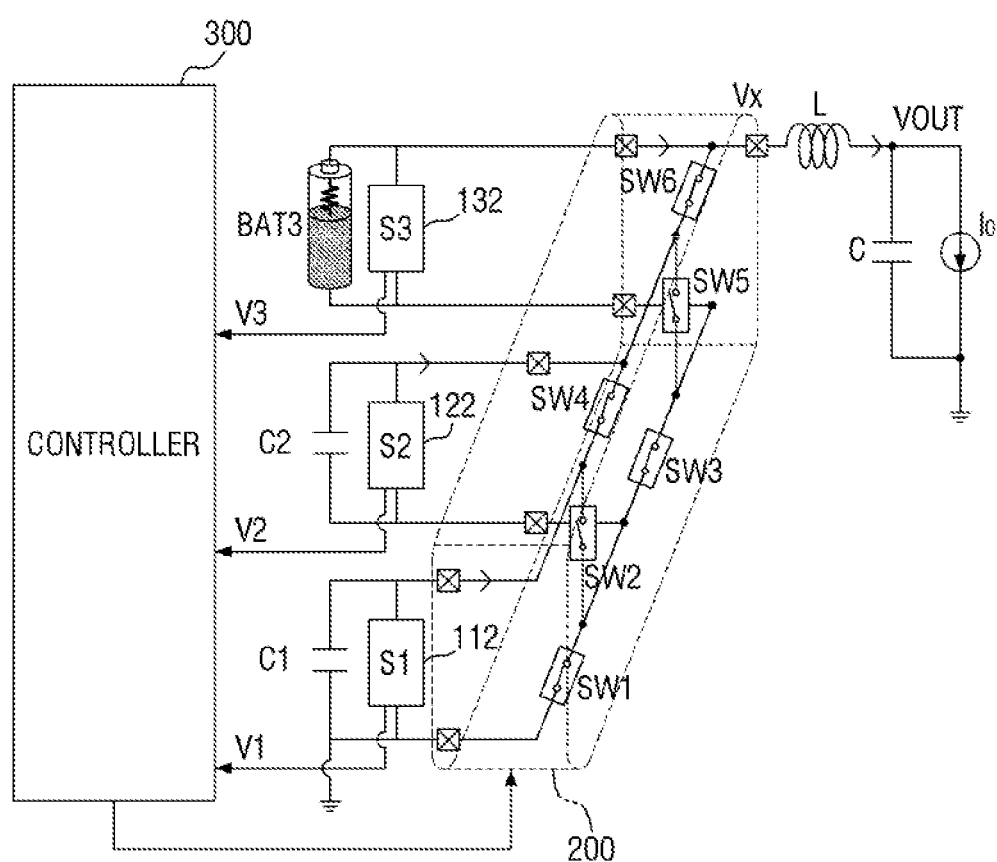
FIG. 9 is a hybrid schematic block and circuit diagram for explaining the semiconductor circuit according to an exemplary embodiment of the present disclosure.
Figure 10:
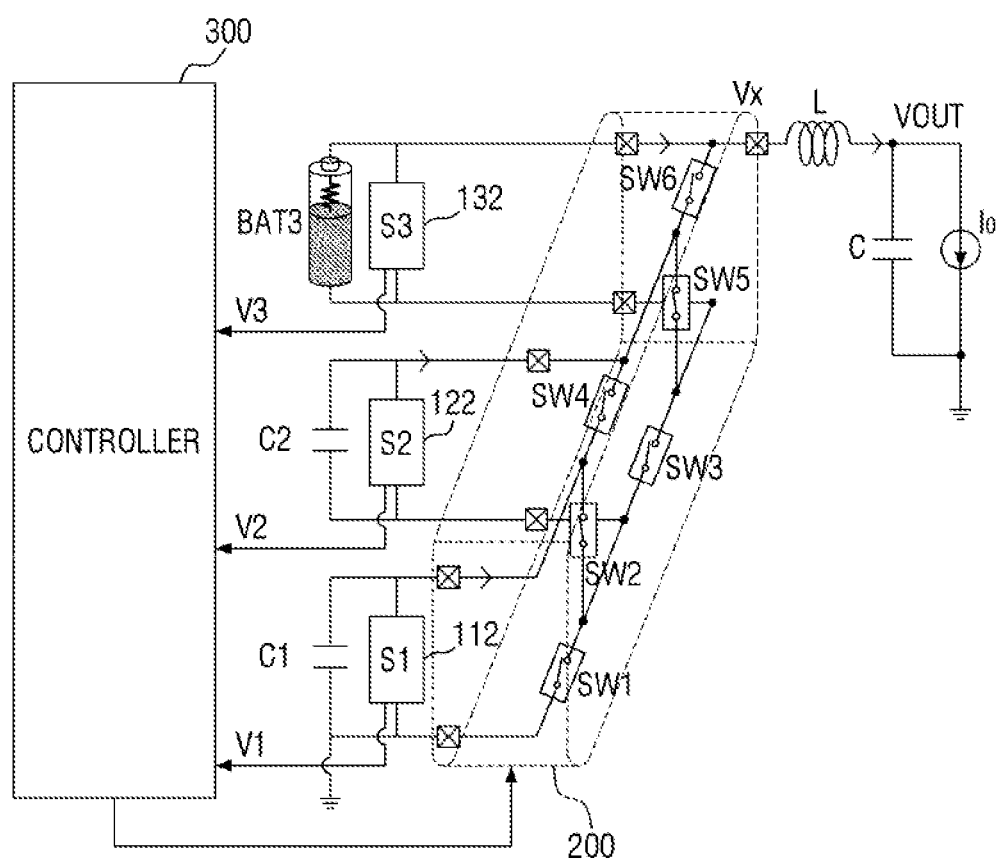
FIG. 10 is a hybrid schematic block and circuit diagram for explaining the semiconductor circuit according to an exemplary embodiment of the present disclosure.

FIGS. 9 and 10 illustrate circuits for explaining a semiconductor circuit according to an embodiment of the present disclosure.

Referring to FIG. 9, a semiconductor circuit 100c according to an embodiment of the present disclosure may be provided with a single battery BAT3, a first selection circuit 110 may select the first capacitor C1, the second selection circuit 120 may select the second capacitor C2, and the third selection circuit 130 may select the third battery BAT3. Although FIG. 9 shows that the third battery BAT3, the first capacitor C1, and the second capacitor C2 are selected, the present disclosure is not limited thereto, and the selection circuits 110 to 130 may each select the corresponding battery depending on the number of batteries provided. For example, the first battery BAT1 may be selected by the first selection circuit 110, the second capacitor C2 may be selected by the second selection circuit 120, and the third capacitor C3 may be selected by the third selection circuit 130. Alternatively, the first capacitor C1 may be selected by the first selection circuit 110, the second battery BAT2 may be selected by the second selection circuit 120, and the third capacitor C3 may be selected by the third selection circuit 130.

The first voltage measuring circuit 112 may measure the first voltage V1 of the first capacitor, the second voltage measuring circuit 122 may measure the second voltage V2 of the second capacitor, and the third voltage measuring circuit 132 may measure the third voltage V3 of the third battery. The measured first to third voltages V1 to V3 may be provided to the controller 300.

The controller 300 may determine the interconnection relationship among the first capacitor C1, the second capacitor C2, and the third battery BAT3 on the basis of the measured first to third voltages V1 to V3 and the target output voltage. The controller 300 may provide a control signal including the determined interconnection relationship to the switching circuit 200.

The switching circuit 200 may connect the first capacitor C1, the second capacitor C2, and the third battery BAT3 in accordance with the control signal. The switching circuit 200 may connect the first capacitor C1, the second capacitor C2, and the third battery BAT3 in parallel in accordance with the control signal provided from the controller 300. For example, the first switch SW1, the third switch SW3, the fourth switch SW4, and the sixth switch SW6 may be in the ON state, and the second switch SW2 and the fifth switch SW5 may be in the OFF state. The first capacitor C1 and the second capacitor C2 may be charged by being connected in parallel to the third battery BAT3.

Referring to FIG. 10, if the first capacitor C1 and the second capacitor C2 are charged, the controller 300 may determine an interconnection relationship among the first capacitor C1, the second capacitor C2 and the third battery BAT3 on the basis of the target output voltage, and may provide a control signal including the interconnection relationship to the switching circuit 200.

The switching circuit 200 may connect the charged first capacitor C1 and/or the charged second capacitor C2 with the third battery BAT3 in series in accordance with the control signal. For example, the second switch SW2 and the fifth switch SW5 may be in the ON state, and the first switch SW1, the third switch SW3, the fourth switch SW4, and the sixth switch SW6 may be in the OFF state. The charged first capacitor C1 and/or the charged second capacitor C2 may be connected in series with the third battery BAT3 to produce an output voltage Vx and may be discharged.

Therefore, the semiconductor circuit 100c according to an embodiment of the present disclosure may generate an output voltage of an electronic device to which the present semiconductor circuit 100c is applied, using a single battery and two capacitors instead of three batteries.

In general, the converter connected to a rear end of the battery may be determined depending on the number of batteries and the interconnection relationship. For example, converters, such as a buck converter which converts the input voltage to a lower voltage, a boost converter which boosts the input voltage to a higher voltage, and a buck-boost converter that boosts the input voltage to a lower voltage or a higher voltage, may be connected to the rear end of the battery. This makes the structure of the circuit including the batteries complicated, and a structure of the converter may vary depending on the number of batteries and the interconnection relationship.

However, in the semiconductor circuit 100c according to an embodiment of the present disclosure, since the capacitor may be connected to a position at which the battery is not selected by the selection circuits 110, 120 and 130, and the interconnection relationship of the battery may be adjusted by the switching circuit 200, the structure of the converter does not vary depending on the number of batteries to be input to the semiconductor circuit 100c and the interconnection relationship between the batteries. Therefore, the structure is not complicated, and a desired output voltage Vx may be generated regardless of the number of batteries and the interconnection relationship thereof.

In addition, for example, if the electronic device requires three batteries but is provided with only two batteries, the semiconductor circuit 100c according to an embodiment of the present disclosure may generate the output voltage Vx, using two batteries and the single capacitor.

Figure 11:
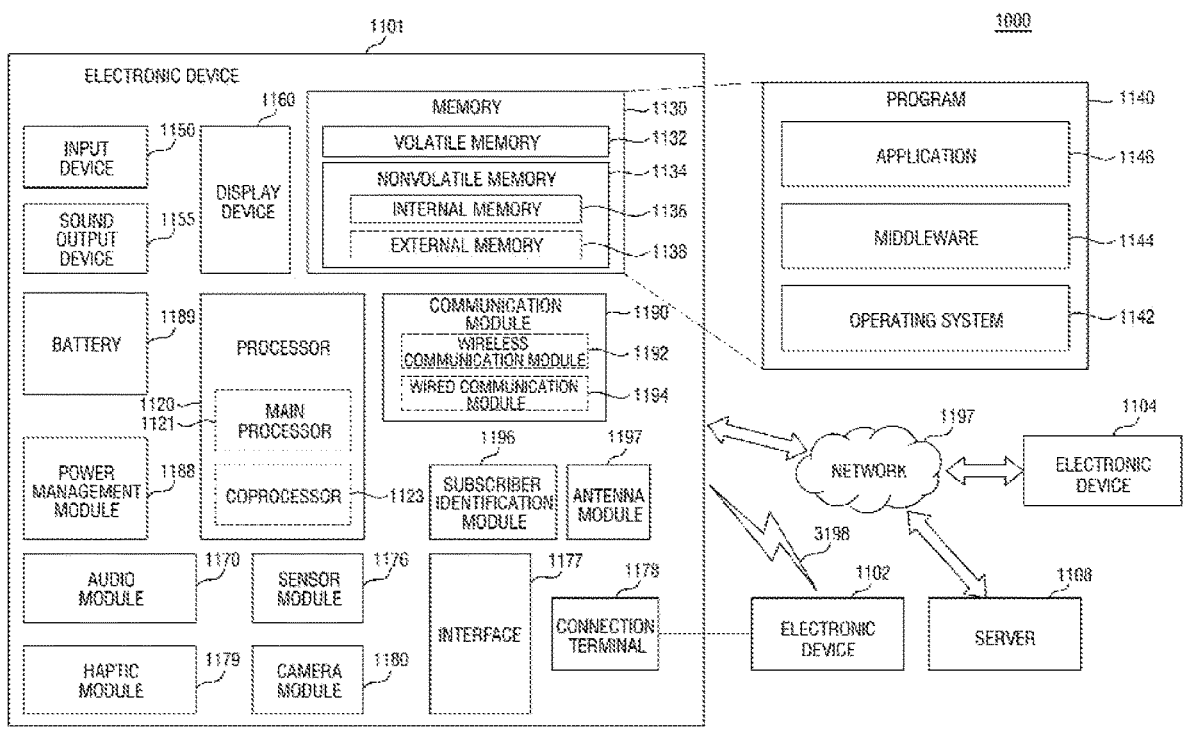
FIG. 11 is a schematic block diagram of an electronic device in a network environment according to an exemplary embodiment of the present disclosure.

FIG. 11 is a block diagram of an electronic device in a network environment according to an embodiment of the present disclosure.

Referring to FIG. 11, an electronic device 1101 in a network environment 1000 according to an embodiment of the present disclosure may communicate with an electronic device 1102 through a first network 1198 such as, for example, a short-range wireless communication, or may communicate with an electronic device 1104 or a server 1108 through a second network 1199 such as, for example, a long-range wireless communication. According to an embodiment, the electronic device 1101 may communicate with the electronic device 1104 through the server 1108. According to an embodiment, the electronic device 1101 may include a processor 1120, an application 1146, a middle ware 1144, a memory 1130 in which a program 1140 including an operating system 1142 is stored, an input device 1150, an audio output device 1155, a display device 1160 such as touch screen display, an audio module 1170, a sensor module 1176, an interface 1177, a haptic module 1179, a camera module 1180, a power management module 1188, a battery 1189, a communication module 1190 including a wireless communication module 1192 and a wired communication module 1194, a subscriber identification module 1196, and an antenna module 1197. In an embodiment, at least one of these components may be omitted from or other components may be added to the electronic device 1101. In an embodiment, some components may be integrated and implemented, such as in the case of a sensor module 1176 such as a fingerprint sensor, an iris sensor or an illumination sensor embedded in the display device 1160.

The power management module 1188 is a module for managing the power supplied to the electronic device 1101, and may be configured, for example, as at least a part of a power management integrated circuit (PMIC) such as the semiconductor circuit 100 of FIG. 1. The battery 1189 is a device for supplying power to at least one component of the electronic device 1101, and may include, for example, a plurality of non-rechargeable primary batteries such as BAT1 to BAT3 and/or rechargeable batteries or capacitors such as C1 through C3 of FIG. 1. The semiconductor circuit according to an embodiment of the invention may be included in the battery 1189 and/or the power management module 1188.

The processor 1120 may, for example, drive software to control at least one other component of the electronic device 101 connected to the processor 1120, and may perform various data processing and operations. The processor 1120 may load and process commands or data received from other components into a volatile memory 1132, and may store the result data in a non-volatile memory 1134. According to an embodiment, the processor 1120 may include a main processor 1121, for example, a central processing unit or an application processor, and a co-processor 1123 that is operated independently of the main processor, and additionally and/or alternatively uses electric power lower than the main processor 1121 or is specialized for a specified function. Here, the co-processor 1123 may be operated separately from the main processor 1121 or by being embedded in the main processor 1121.

The electronic device 1101 may include, for example, at least one of a mobile communication device such as a smartphone, a computer device, a portable multimedia device, a portable medical device, a camera, a wearable device or a home appliance. The present disclosure is not limited thereto, and may be applied to an electronic device which uses a primary battery.

In concluding the detailed description, those of ordinary skill in the pertinent art will appreciate that many variations and modifications may be made to the exemplary embodiments without departing from the principles of the present disclosure. Therefore, the disclosed embodiments are to be taken in a generic, descriptive or exemplary sense, and not for purposes of limitation.

What is claimed is:

1. A semiconductor circuit comprising:
   a switching circuit;
   a first electrical energy storage device that comprises a first battery, a first capacitor, and a first selection circuit configured to connect the switching circuit and at least one of the first battery or the first capacitor;
   a second electrical energy storage device that comprises a second battery, a second capacitor, and a second selection circuit configured to connect the switching circuit and at least one of the second battery or the second capacitor;
   a voltage measuring circuit configured to measure a first voltage of the first electrical energy storage device and a second voltage of the second electrical energy storage device; and
   a controller configured to compare the first voltage and the second voltage and to generate a comparison result,
   wherein the switching circuit is configured to connect the first electrical energy storage device and the second electrical energy storage device in an interconnection relationship based on the comparison result, and to provide to an output terminal an output,
   wherein the first selection circuit is configured to connect the switching circuit without the first capacitor to the first battery when the first battery is not discharged, and the first selection circuit is configured to connect the switching circuit without the first battery to the first capacitor when the first battery is discharged,
   wherein the second selection circuit is configured to connect the switching circuit without the second capacitor to the second battery when the second battery is not discharged, and the second selection circuit is configured to connect the switching circuit without the second battery to the second capacitor when the second battery is discharged, and
   wherein the interconnection relationship of the first electrical energy storage device and the second electrical energy storage device is one of a serial interconnection or a parallel interconnection.

2. The semiconductor circuit of claim 1, wherein:
   the first selection circuit is provided with a selection signal including a number of batteries to be provided, and connects the switching circuit and the first battery based on the selection signal, the second selection circuit is provided with the selection signal, and connects the switching circuit and the second capacitor based on the selection signal, and the number of batteries to be provided is the same as that of the first and second batteries.

3. The semiconductor circuit of claim 1, further comprising:

a third electrical energy storage device that comprises a third battery, a third capacitor, and a third selection circuit configured to connect the switching circuit and at least one of the third battery or the third capacitor;

wherein the first selection circuit connects the switching circuit and the first battery, the second selection circuit connects the switching circuit and the second battery, and the third selection circuit connects the switching circuit and the third battery, wherein the voltage measuring circuit measures the first voltage of the first battery, measures the second voltage of the second battery, and measures a third voltage of the third battery, wherein the controller compares the first voltage, the second voltage and the third voltage to generate the comparison result, and wherein the switching circuit connects the third battery to the output terminal without connecting the first battery and the second battery to the output terminal based on the comparison result.

4. The semiconductor circuit of claim 3, wherein the third voltage is higher than the first voltage and the second voltage.

5. The semiconductor circuit of claim 4, wherein the switching circuit connects the first battery, the second battery, and the third battery in series or in parallel when the third voltage is equal to or less than the first voltage or the second voltage.

6. The semiconductor circuit of claim 1, further comprising:

a third electrical energy storage device that comprises a third battery, a third capacitor, and a third selection circuit configured to connect the switching circuit and at least one of the third battery or the third capacitor;

wherein the first selection circuit connects the switching circuit and the first battery, the second selection circuit connects the switching circuit and the second battery, and the third selection circuit connects the switching circuit and the third battery, wherein the voltage measuring circuit measures the first voltage of the first battery, measures the second voltage of the second battery, and measures a third voltage of the third battery, wherein the controller compares the first voltage, the second voltage and the third voltage to generate the comparison result, and wherein the switching circuit connects the second battery and the third battery to the output terminal without connecting the first battery to the output terminal based on the comparison result.

7. The semiconductor circuit of claim 6, wherein:

the first voltage is lower than the second voltage and the third voltage, and a difference between the second voltage and the third voltage is lower than a set voltage.

8. The semiconductor circuit of claim 7, wherein the switching circuit connects the first battery, the second battery, and the third battery in series or in parallel when the second voltage or the third voltage is equal to or less than the first voltage.

9. The semiconductor circuit of claim 1, further comprising:

a third electrical energy storage device that comprises a third battery, a third capacitor, and a third selection circuit configured to connect the switching circuit and at least one of the third battery or the third capacitor;

wherein the first selection circuit connects the switching circuit and the first battery, wherein the second selection circuit connects the switching circuit and the second battery, wherein the third selection circuit connects the switching circuit and the third capacitor, wherein the voltage measuring circuit measures the first voltage of the first battery, measures the second voltage of the second battery, and measures a third voltage of the third capacitor, wherein the controller compares the first voltage, the second voltage and the third voltage to generate the comparison result, and wherein the switching circuit connects the first battery and the third capacitor in parallel to charge the third capacitor without connecting the second battery to the output terminal based on the comparison result.

10. The semiconductor circuit of claim 9, wherein the first voltage is higher than the second voltage and the third voltage.

11. The semiconductor circuit of claim 9, wherein the switching circuit connects the first battery, the second battery, and the third capacitor in series or in parallel when the third voltage becomes the same as the first voltage.

12. The semiconductor circuit of claim 1, further comprising:

a third electrical energy storage device that comprises a third battery, a third capacitor, and a third selection circuit configured to connect the switching circuit and at least one of the third battery or the third capacitor;

wherein the switching circuit includes a first switch connected to a cathode of the first battery or the first capacitor connected to the switching circuit by the first selection circuit, and a cathode of the second battery or the second capacitor connected to the switching circuit by the second selection circuit, a second switch connected to an anode of the first battery or the first capacitor connected to the switching circuit by the first selection circuit and the cathode of the second battery or the second capacitor connected to the switching circuit by the second selection circuit, a third switch connected to the cathode of the second battery or the second capacitor connected to the switching circuit by the second selection circuit and a cathode of the third battery or the third capacitor connected to the switching circuit by the third selection circuit, a fourth switch connected to the anode of the first battery or the first capacitor connected to the switching circuit by the first selection circuit and an anode of the second battery or the second capacitor connected to the switching circuit by the second selection circuit, a fifth switch connected to the anode of the second battery or the second capacitor connected to the switching circuit by the second selection circuit and the cathode of the third battery or the third capacitor connected to the switching circuit by the third selection circuit, and a sixth switch connected to the anode of the second battery or the second capacitor connected to the switching circuit by the second selection circuit and the anode of the third battery or the third capacitor connected to the switching circuit by the third selection circuit.

13. The semiconductor circuit of claim 1, further comprising:
a third electrical energy storage device that comprises a third battery, a third capacitor, and a third selection circuit configured to connect the switching circuit and at least one of the third battery or the third capacitor;
wherein the first selection circuit connects the switching circuit and the first battery, the second selection circuit connects the switching circuit and the second capacitor, and the third selection circuit connects the switching circuit and the third capacitor,
wherein the voltage measuring circuit measures the first voltage of the first battery, measures the second voltage of the second capacitor, and measures a third voltage of the third capacitor,
wherein the controller compares the first voltage, the second voltage and the third voltage to generate the comparison result,
wherein the switching circuit connects the first battery and the second capacitor in parallel to charge the second capacitor, and connects the first battery and the third capacitor in parallel to charge the third capacitor, based on the comparison result, and
wherein the switching circuit connects the second capacitor, the third capacitor, and the first battery in series or in parallel when the second voltage and the third voltage is the same as the first voltage.

14. The semiconductor circuit of claim 1,
wherein the switching circuit is directly connected between an input terminal and the output terminal of the semiconductor circuit,
wherein at least one of the first selection circuit or the second selection circuit of the respective electrical energy storage device is configured to connect the respective battery without the respective capacitor to the switching circuit when the respective battery is not substantially discharged,
wherein at least one of the first selection circuit or the second selection circuit of the respective electrical energy storage device is configured to connect the respective capacitor without the respective battery to the switching circuit when the respective battery is substantially discharged.

15. A semiconductor circuit comprising:
a plurality of electrical energy storage devices that each comprise a respective battery and a respective capacitor;
a switching circuit configured to connect each of the plurality of electrical energy storage devices in series and/or in parallel with each other, respectively;
a voltage measuring circuit configured to measure each of the plurality of electrical energy storage devices to obtain measured voltages; and
a controller configured to determine a series or parallel connection state of the plurality of electrical energy storage devices based on a number of the plurality of electrical energy storage devices and measured voltages of each of the plurality of electrical energy storage devices, and to provide the switching circuit with a control signal including the determined series or parallel connection state of the plurality of electrical energy storage devices based on the measured voltages,
wherein the controller is configured to compares the measured voltages of each of the plurality of electrical energy storage devices, and does not to connect each to another of the plurality of electrical energy storage devices having a lowest voltage among the measured voltages of each of the plurality of electrical energy storage devices,
wherein the plurality of electrical energy storage devices includes a first battery, a second battery and a third battery different from each other, and
wherein the switching circuit includes a first switch connected to a cathode of the first battery and a cathode of the second battery, a second switch connected to an anode of the first battery and the cathode of the second battery, a third switch connected to the cathode of the second battery and a cathode of the third battery, a fourth switch connected to the anode of the first battery and an anode of the second battery, a fifth switch connected to the anode of the second battery and the cathode of the third battery, and a sixth switch connected to the anode of the second battery and the cathode of the third battery.

16. The semiconductor circuit of claim 15, wherein:
an output terminal is connected to the anode of the third battery, and
a ground stage is connected to the cathode of the first battery.

17. The semiconductor circuit of claim 16,
wherein the switching circuit is directly connected between an input terminal and the output terminal of the semiconductor circuit.

18. A semiconductor circuit comprising:
a first electrical energy storage device that comprises a first battery and a first capacitor;
a second electrical energy storage device that comprises a second battery and a second capacitor different from the first battery and the first capacitor, respectively;
a switching circuit configured to connect the first and second electrical energy storage devices in series or in parallel; and
a selection circuit configured to connect the switching circuit and the first capacitor instead of the first battery when the first battery is discharged,
wherein the switching circuit connects the first capacitor and the second battery in series or in parallel depending on a voltage of the first capacitor, and
wherein the first capacitor is connected in parallel to the second battery when the first capacitor is to be charged, and the first capacitor is connected in series to the second battery when the first capacitor is to be discharged,
wherein the switching circuit is configured to connect to an output terminal to generate an output voltage, and
wherein the switching circuit is configured to generate the output voltage using the second battery when the first capacitor is discharged, and the switching circuit is configured to generate the output voltage using the first capacitor and the second battery when the first capacitor is charged.

19. The semiconductor circuit of claim 18, wherein the semiconductor circuit compares voltages of each of the first and second electrical energy storage devices, and the switching circuit does not connect each to another of the first or second electrical energy storage devices having a lowest voltage among the compared voltages of each of the first and second electrical energy storage devices.

20. The semiconductor circuit of claim 18,
wherein the switching circuit is directly connected between an input terminal and the output terminal of the semiconductor circuit,
wherein the selection circuit is configured to connect the switching circuit and the first battery instead of the first capacitor when the first battery is not substantially discharged.

* * * * *